United States Patent
Garner

(10) Patent No.: US 12,470,028 B2
(45) Date of Patent: Nov. 11, 2025

(54) LOW-PROFILE TRACK SYSTEM

(71) Applicant: JUNIPER DESIGN GROUP INC., Southington, CT (US)

(72) Inventor: Michael Garner, North Barrington, IL (US)

(73) Assignee: JUNIPER DESIGN GROUP INC., Southington, CT (US)

( * ) Notice: Subject to any disclaimer, the term of this patent is extended or adjusted under 35 U.S.C. 154(b) by 436 days.

(21) Appl. No.: 18/118,029

(22) Filed: Mar. 6, 2023

(65) Prior Publication Data
US 2024/0305052 A1 Sep. 12, 2024

(51) Int. Cl.
| | |
|---|---|
| H01R 31/06 | (2006.01) |
| H01R 13/26 | (2006.01) |
| H01R 13/627 | (2006.01) |
| H01R 24/20 | (2011.01) |
| H01R 43/26 | (2006.01) |
| H02G 3/06 | (2006.01) |
| H01R 13/641 | (2006.01) |
| H01R 103/00 | (2006.01) |

(52) U.S. Cl.
CPC ............ *H01R 31/06* (2013.01); *H01R 13/26* (2013.01); *H01R 13/6271* (2013.01); *H01R 24/20* (2013.01); *H01R 43/26* (2013.01); *H02G 3/0608* (2013.01); *H01R 13/641* (2013.01); *H01R 2103/00* (2013.01)

(58) Field of Classification Search
CPC .... H01R 31/06; H01R 13/26; H01R 13/6271; H01R 13/641; H01R 24/20; H01R 43/26; H01R 2103/00
See application file for complete search history.

(56) References Cited

U.S. PATENT DOCUMENTS

| | | | |
|---|---|---|---|
| 3,345,471 A | 10/1967 | Kilburg | |
| 3,622,938 A * | 11/1971 | Ito | H01R 25/145 439/115 |
| 3,832,503 A | 8/1974 | Crane | |
| 4,089,578 A * | 5/1978 | Valtonen | H01R 25/145 439/115 |

(Continued)

OTHER PUBLICATIONS

United States Patent and Trademark Office, U.S. Appl. No. 16/829,730, Notice of Allowance dated Aug. 6, 2021, 5 pages.

(Continued)

*Primary Examiner* — Harshad C Patel
(74) *Attorney, Agent, or Firm* — Polsinelli

(57) ABSTRACT

A low-profile track system includes low-profile joiner components or devices that releasably couple and electrically connect track segments together. In one example, the joiner device includes a protruding portion configured to fit within corresponding cavity of a receptacle at the end of a track segment. To maintain a low profile, the joiner device can include joiner contacts that exert an outward lateral force that engages with corresponding receptacle contacts disposed in the cavity of the receptacle. The joiner device further includes a secondary or complimentary fastener or connector associated with the protruding portion that releasably engages a corresponding fastener disposed in the cavity of the receptacle, where the complimentary fastener and exerts a force in a direction orthogonal to the outward lateral force.

20 Claims, 13 Drawing Sheets

(56) References Cited

U.S. PATENT DOCUMENTS

| | | | | |
|---|---|---|---|---|
| 4,245,874 A * | 1/1981 | Bishop | .................... | H01R 35/02 |
| | | | | 174/70 B |
| 4,919,625 A | 4/1990 | Coutre | | |
| 5,096,433 A * | 3/1992 | Boundy | ................ | H02G 3/288 |
| | | | | 439/654 |
| 5,336,097 A * | 8/1994 | Williamson, Jr. | ..... | H02G 3/288 |
| | | | | 439/94 |
| 5,336,100 A * | 8/1994 | Gabrius | ................ | H01R 25/14 |
| | | | | 439/115 |
| 5,341,276 A | 8/1994 | Shen | | |
| 5,655,922 A * | 8/1997 | Dux | .................... | H05K 7/1478 |
| | | | | 439/717 |
| 5,760,339 A * | 6/1998 | Faulkner | ................ | H02G 5/007 |
| | | | | 174/88 B |
| 5,833,358 A | 11/1998 | Patik | | |
| 5,885,109 A * | 3/1999 | Lee | .................... | H01R 31/065 |
| | | | | 439/652 |
| 6,033,239 A * | 3/2000 | Jaakkola | ............ | H01R 25/145 |
| | | | | 439/94 |
| 6,059,582 A | 5/2000 | Tsai | | |
| 6,079,992 A | 6/2000 | Kuchar et al. | | |
| 6,093,037 A * | 7/2000 | Lin | .................... | H01R 25/162 |
| | | | | 439/115 |
| 6,190,198 B1 | 2/2001 | Ray | | |
| 6,204,632 B1 | 3/2001 | Nierescher et al. | | |
| 6,358,070 B1 * | 3/2002 | Lin | .................... | H01R 25/145 |
| | | | | 439/115 |
| 6,497,586 B1 | 12/2002 | Wilson | | |
| 6,521,837 B2 * | 2/2003 | Hilgert | ................ | H02G 3/0608 |
| | | | | 174/70 B |
| 6,575,777 B2 * | 6/2003 | Henriott | ............... | H01R 25/162 |
| | | | | 439/654 |
| 6,652,288 B2 * | 11/2003 | Laukhuf | ................ | H01R 31/02 |
| | | | | 439/32 |
| 6,755,676 B2 * | 6/2004 | Milan | .................... | H01R 25/003 |
| | | | | 439/620.29 |
| 6,835,081 B2 * | 12/2004 | Plattner | ................ | H01R 13/514 |
| | | | | 439/215 |
| 6,870,103 B1 * | 3/2005 | Wiant | .................... | H02G 5/007 |
| | | | | 174/70 B |
| 6,939,153 B1 * | 9/2005 | Kondas | .................. | H01R 13/73 |
| | | | | 439/654 |
| 7,520,762 B2 | 4/2009 | Lehman et al. | | |
| 7,654,834 B1 | 2/2010 | Mier-Langner et al. | | |
| 7,688,564 B2 * | 3/2010 | Byrne | ................ | H01R 13/6666 |
| | | | | 361/111 |
| 7,914,198 B2 | 3/2011 | Mier-Langner et al. | | |
| 7,946,883 B2 * | 5/2011 | Hayes | .................... | H01R 25/16 |
| | | | | 439/502 |
| 10,164,388 B2 * | 12/2018 | Kokenda | ................ | H02G 5/002 |
| 11,118,742 B2 * | 9/2021 | Hamer | .................... | F21V 21/30 |
| 2002/0064979 A1 | 5/2002 | Zakerzewski | | |
| 2002/0137374 A1 | 9/2002 | O'Rourke et al. | | |
| 2003/0223234 A1 * | 12/2003 | Tang | .................... | H01R 25/142 |
| | | | | 362/648 |
| 2004/0005798 A1 | 1/2004 | Lin | | |
| 2005/0078482 A1 | 4/2005 | Bartlett | | |
| 2008/0081500 A1 * | 4/2008 | Chen | .................... | H01R 25/145 |
| | | | | 439/209 |
| 2010/0055947 A1 | 3/2010 | Fong | | |
| 2010/0203757 A1 * | 8/2010 | Mostoller | ............ | H01R 25/162 |
| | | | | 439/510 |
| 2010/0311267 A1 | 12/2010 | Mouchon et al. | | |
| 2011/0141749 A1 | 6/2011 | Fishman et al. | | |
| 2011/0312199 A1 | 12/2011 | Alrutz et al. | | |
| 2012/0264317 A1 * | 10/2012 | Balcerak | ............ | H01R 9/2675 |
| | | | | 439/212 |
| 2014/0016503 A1 | 1/2014 | Altekar et al. | | |
| 2015/0024615 A1 | 1/2015 | Lindblom et al. | | |
| 2016/0104985 A1 | 4/2016 | Ewing et al. | | |
| 2016/0156169 A1 * | 6/2016 | Jaena | .................... | H02G 5/007 |
| | | | | 439/213 |
| 2019/0353335 A1 | 11/2019 | Terumichi | | |

OTHER PUBLICATIONS

United States Patent and Trademark Office, U.S. Appl. No. 16/829,730, Office Action dated Apr. 13, 2021, 5 pages.
United States Patent and Trademark Office, U.S. Appl. No. 16/253,687, Office Action dated Feb. 21, 2020, 7 pages.

* cited by examiner

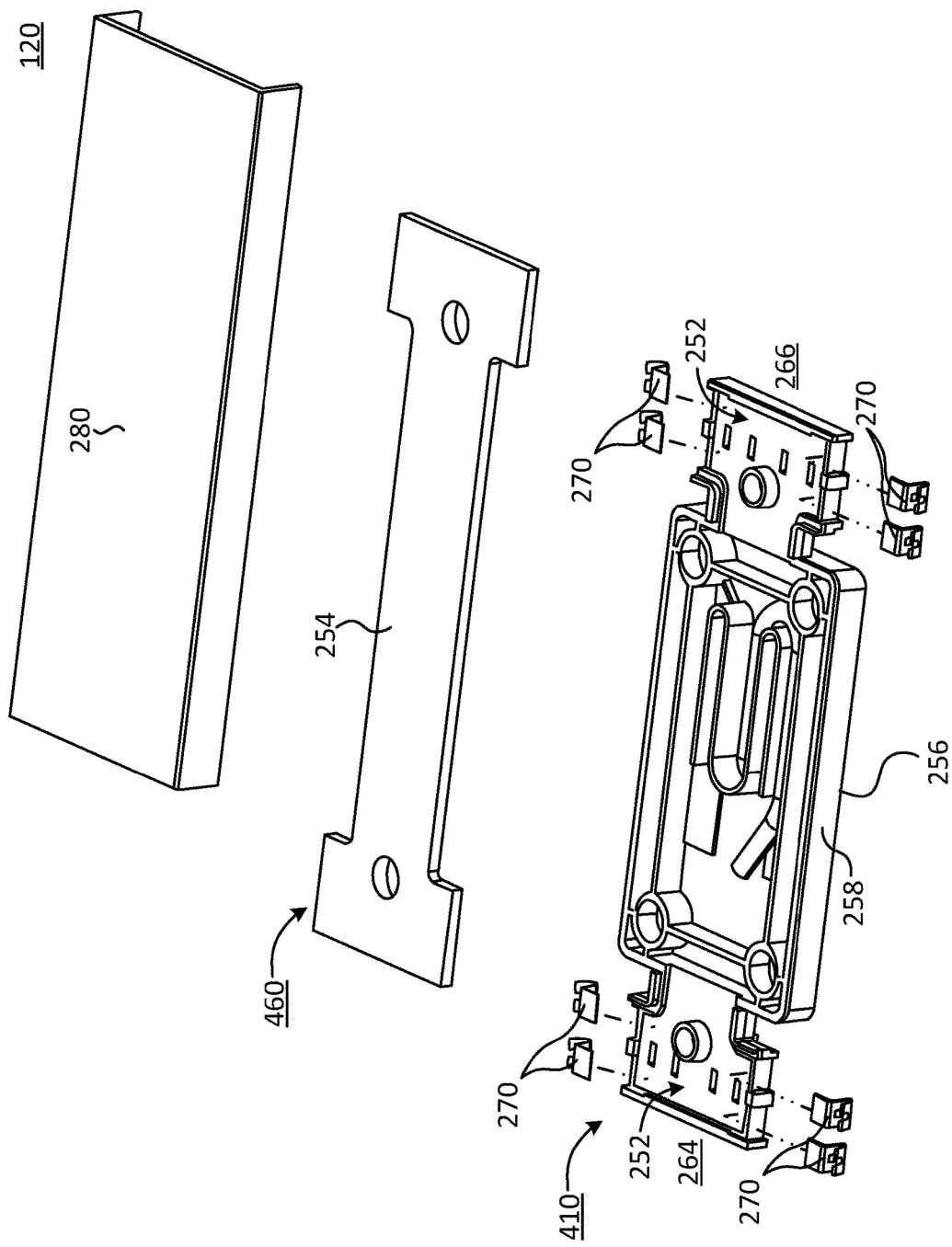

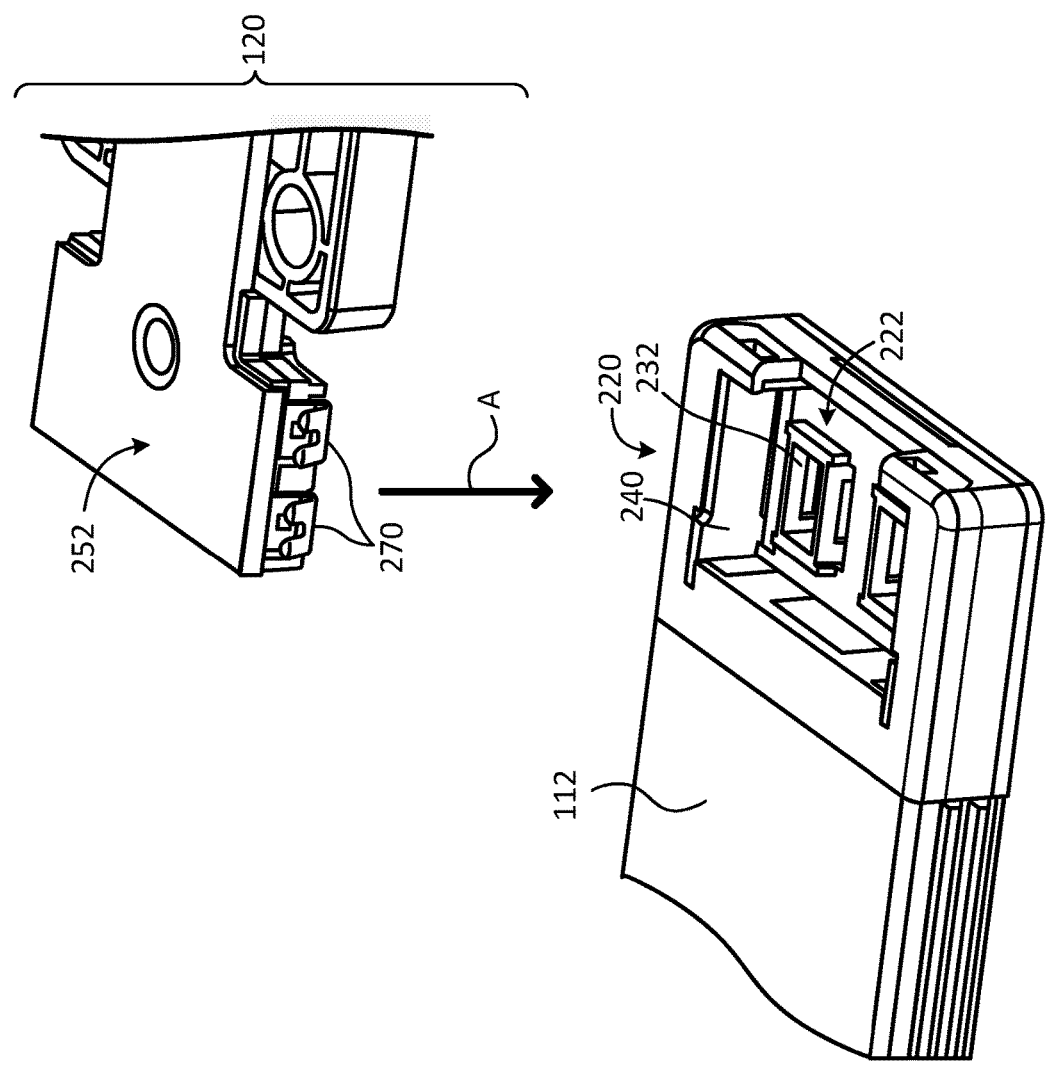

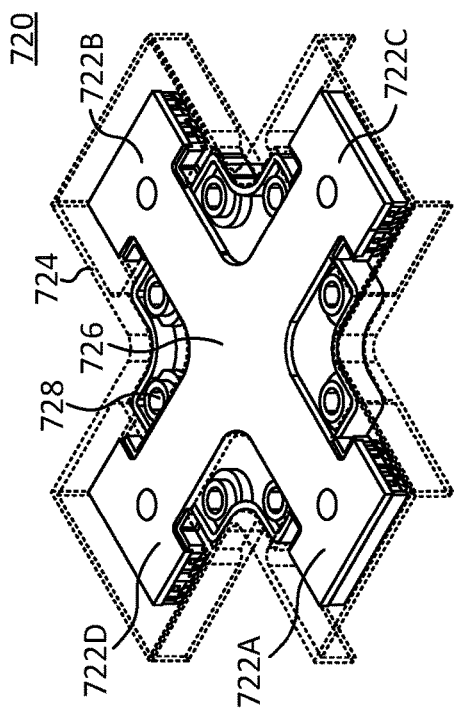
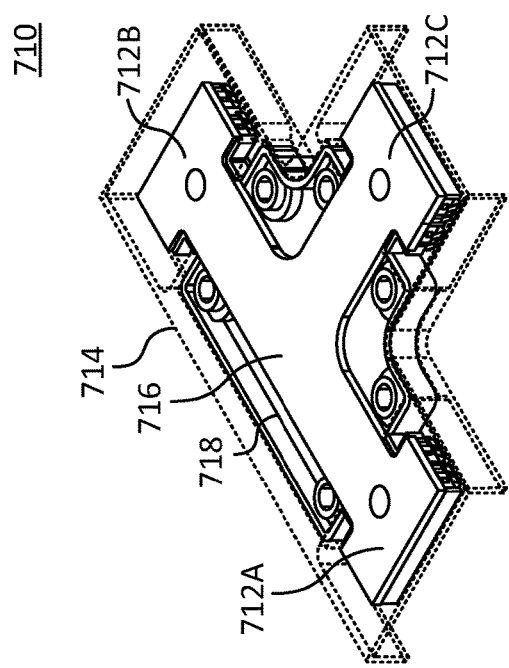
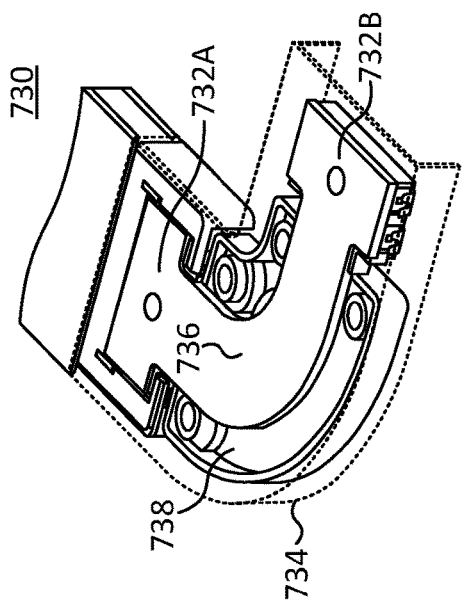
FIG. 7A
FIG. 7B
FIG. 7C

LOW-PROFILE TRACK SYSTEM

TECHNICAL FIELD

The present disclosure relates generally to lighting systems and in particular, low-profile track lighting systems, devices, and methods.

BACKGROUND

Conventional light fixtures generally include fixed or stationary housings that are "plugged" into corresponding electrical sockets with appropriate wiring, terminal plugs, and so on. However, the length of wiring between the light fixture and the electrical socket limit where the light fixture can be placed in a given space or room. Track lighting systems offer flexible or adjustable fixture placement options that allow corresponding track fixtures to be coupled to various locations along the length of a corresponding electrified track. Moreover, the electrified track can be mounted on or suspended from a variety of surfaces (e.g., ceilings, walls, beams, rafters, etc.). However, in order to comply with various industry standards (e.g., mechanical strength tests, load tests, force tests, etc.), many existing track systems often include bulky fixtures and/or high profile electrified tracks in order to provide adequate surface areas for mounting the track to a given surface and/or securing fixtures along the length of the track. In addition, conventional track systems often require professionals (e.g., electricians, contractors, etc.) to electrically wire and mount the track, extend the track, and/or adjust the position of the track relative to the mounting surface.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 4A illustrates an exploded perspective view of the joiner device shown in FIG. 2A generally viewed from a top side;

FIG. 5A illustrates a perspective view of a joiner device and an end portion of a track segment;

FIG. 7A illustrates an isometric view of a joiner device having a 3-way connector arrangement;

FIG. 7B illustrates an isometric view of a joiner device having a 4-way connector arrangement;

FIG. 7C illustrates a perspective view of a joiner device having a 2-way 90 degree Connector arrangement;

DESCRIPTION OF EXAMPLE EMBODIMENTS

Overview

Figure 1:
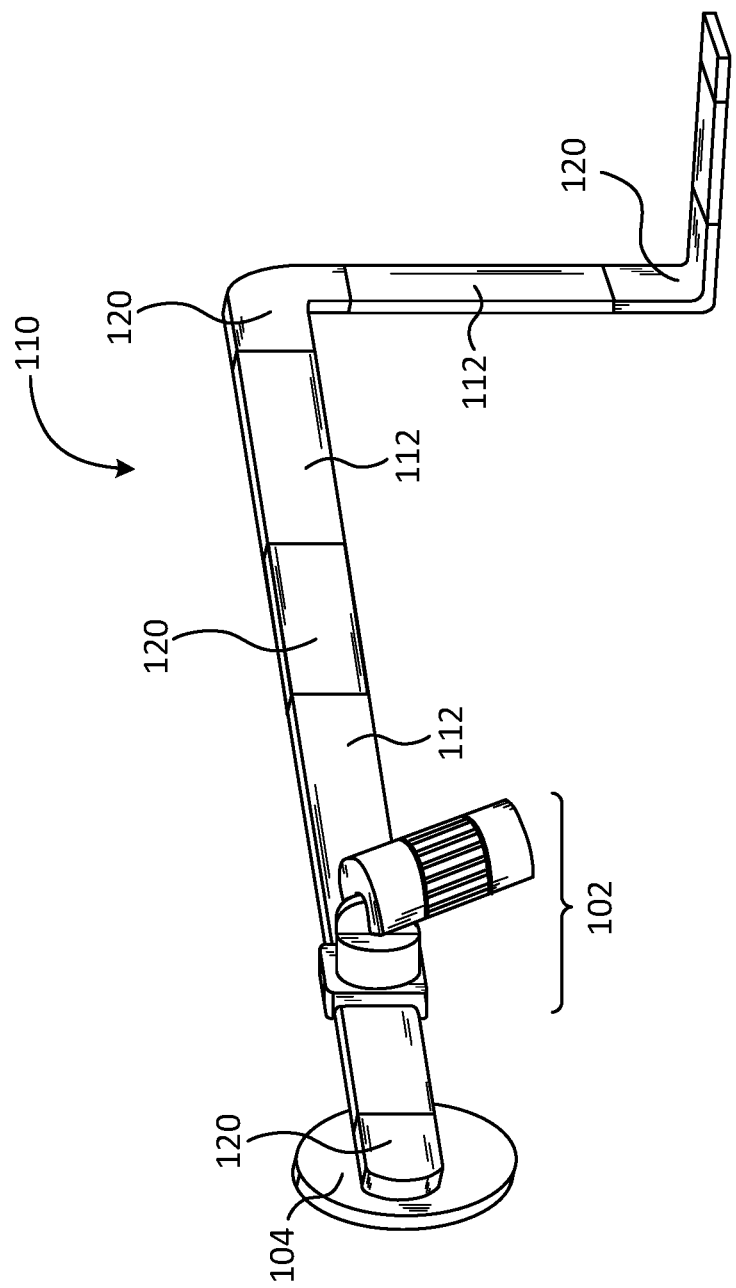
FIG. 1 illustrates an isometric view of a low-profile track system, according to one embodiment of this disclosure.

According to one or more embodiments, an electrical track system includes modular low-profile track segments and joiner components or devices that provide greater flexibility to customize the placement and orientation of track fixtures throughout a given space. The modular low-profile components disclosed herein do not require expensive professional contractors or complicated electrical installation and instead provide snap-fit style engagement mechanisms that electrically and mechanically connect track segments and track fixtures.

For example, in one embodiment, a low-profile track system includes receptacles positioned at ends of respective track segments and joiner components that releasably couple to the receptacles to join or connect track segments together. In this embodiment, the receptacle has a cavity that defines an interior wall between a top and bottom portion, a mechanical connection element (e.g., a type of "fastener" or "connector") disposed in the cavity, and electrical receptacle contacts positioned along the interior wall of the cavity. Notably, the electrical receptacle contacts are coupled to conducting elements of the corresponding track segment. The joiner component couples to the receptacle and includes a lateral wall disposed between its top and bottom portions. The joiner component includes a protruding portion that mates with or is configured to fit within the cavity of the receptacle as well as electrical-joiner contacts and a complimentary mechanical connector (e.g., a complimentary "fastener" or "connector"). To maintain a low profile, the joiner contacts of the joiner component are positioned along portions of the lateral wall associated with its protruding portion. These joiner contacts are biased to exert an outward lateral force that releasably engages with the electrical receptacle contacts in the receptacle cavity. In addition, the complimentary mechanical connector of the joiner component also releasably engages with the mechanical connection element of the receptacle to provide an additional mechanical securing force in a direction orthogonal to the outward lateral force. These and other features are described throughout the embodiments described herein.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments. Thus, the present technology can include a variety of combinations and/or integrations of the embodiments and features described herein.

As used herein, direction or relational terms such as "front," "back," "left," "right," "top," and "bottom" are used to facilitate understanding and discussion, not limitation. For example, these terms generally provide context for viewing embodiments and understanding relative positions and orientations of associated components. Similarly, the term "longitudinal" generally refers to an orientation or direction relative to an axis of elongation, whereas "lateral" refers to an orientation or direction that is generally perpendicular to the axis of elongation. Likewise, the terms "parallel," "planar," "coplanar," "orthogonal" and so on are also used to describe relationships and relative positions of components. In this regard, it should be understood that these terms are not used in their absolute sense but are instead used to describe general orientations and configurations. For example, the term "substantially" as known in the art, may be used herein to generalize the disclosed relationships and relative positions of components to account for manufacturing tolerances and/or minor design modifications or alterations that do not depart from the spirit and scope of this disclosure. As used herein, the terms "coupled", "secured," and/or "engaged" refers to components being mechanically and/or electrically connected to each another either directly or indirectly or through one or more intermediary components. Finally, it is also appreciated that the illustrated devices and structures may include a plurality of the same component referenced by the same number. It is appreciated that depending on the context, the description may interchangeably refer to an individual component or use a plural form of the given component(s) with the corresponding reference number.

As mentioned above, existing electrical track systems must comply with industry standards, which establish the type, direction, and amount of forces the fixture must withstand. These standards influence track designs and track fixture designs, which often results in large and bulky components since larger components can provide greater surface areas for dispersing, attenuating, or otherwise resisting forces. Existing track systems also tend to be designed with high-voltage fixtures in mind, further reinforcing bulky track designs. Bulky tracks are aesthetically displeasing and may be difficult to secure or attach to a corresponding track or another electrical component. Further, consumers desire versatility and modularity when installing a track system. Accordingly, this disclosure describes track systems and components that meet or exceed various industry standards with a sleek and low-profile form factor by leveraging novel electrical and mechanical engagement mechanisms.

Referring now to the figures, FIG. 1 illustrates an isometric view of a track system 100, according to one embodiment of this disclosure. As shown, track system 100 generally has a low form profile and includes a fixture 102 (e.g., a light) as well as a number of modular interlocking track segments 112 and joiner components or joiner devices 120 that collectively form a "track" (generally referenced as track 110). In general, joiner devices 120 act as a bridge that electrically and mechanically connect track segments 112 together and/or connect a given track segment to another electrical component such as a junction box 104.

Track 110 includes electrical components and wiring that provide power to fixture 102. Notably, junction box 104 electrically connects track 110 to existing electrical infrastructure. As shown, joiner devices 120 provide greater flexibility to customize the relative position and orientation of a track segment 112 (and thus track 110) in a given space. For example, as shown, joiner devices 120 can be configured to connect two or more track segments 112 in a substantially coplanar arrangement (e.g., flush) or a substantially non-coplanar arrangement as shown.

Figure 2A:
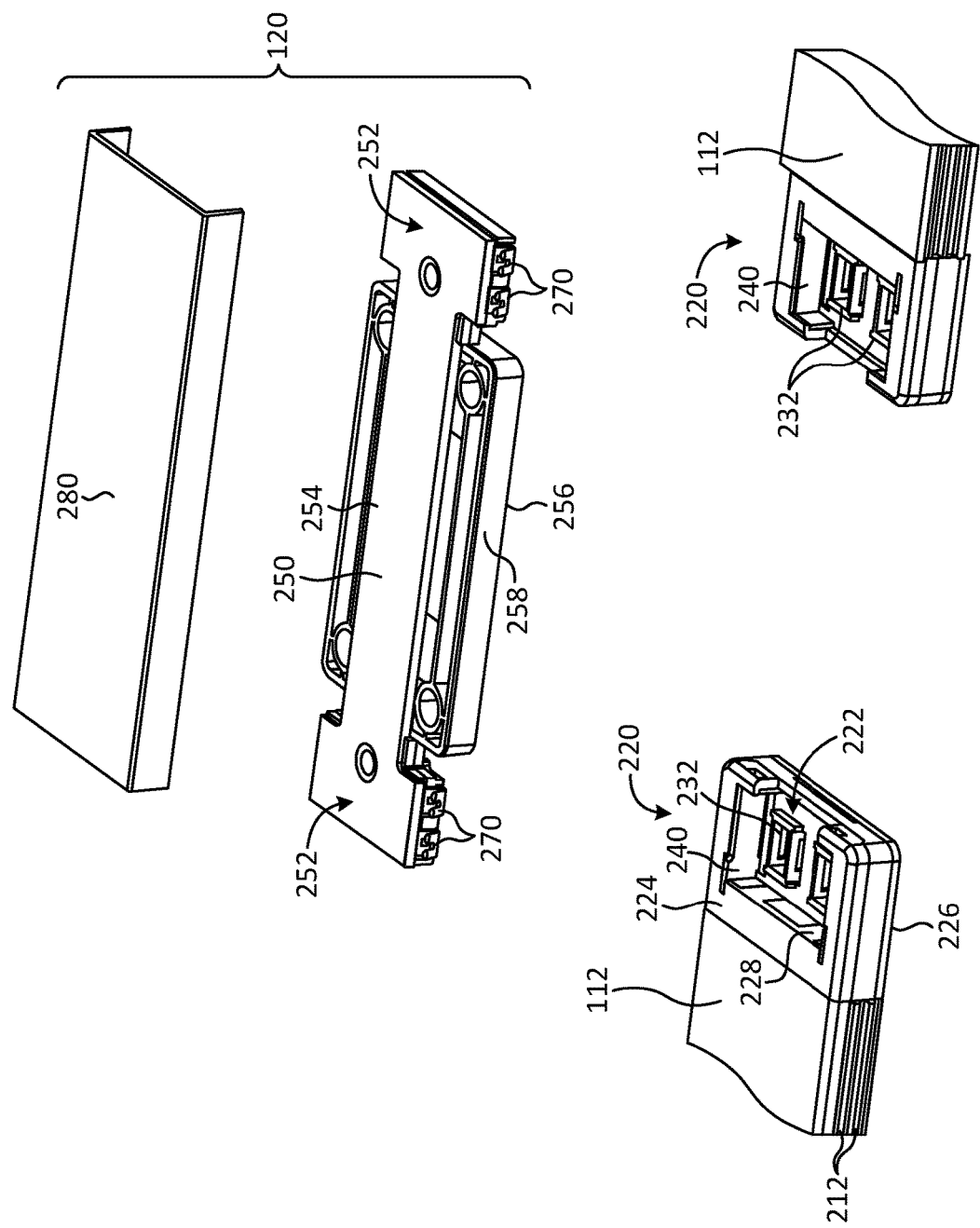
FIG. 2A illustrates an isometric view of a portion of the low-profile track system shown in FIG. 1 generally viewed from a top side, showing end portions of track segments and a joiner device.
Figure 2B:
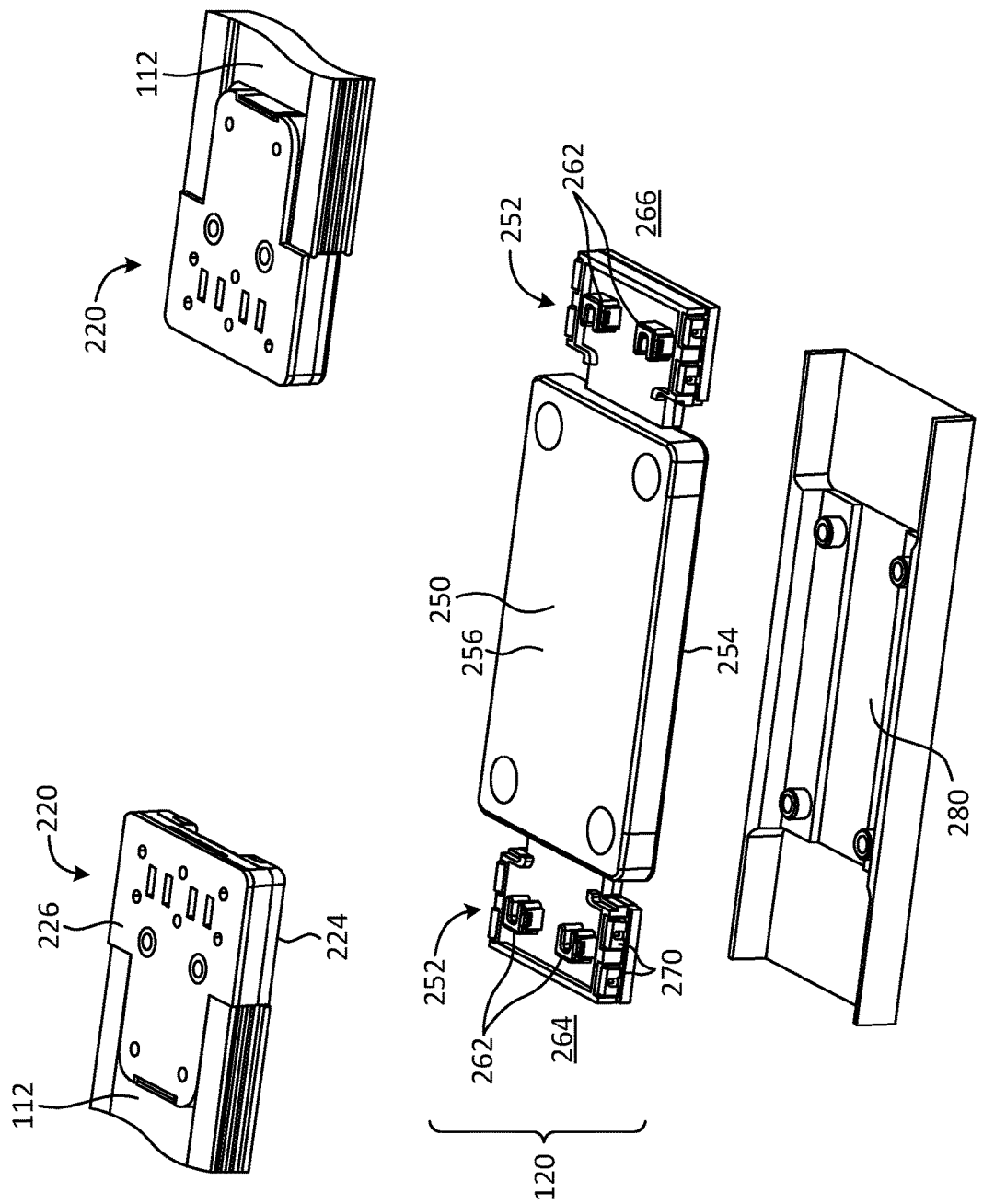
FIG. 2B illustrates an isometric view of the portion of the low-profile track system shown in FIG. 2A generally viewed from a bottom side.

FIGS. 2A and 2B illustrate isometric and partially exploded views of track segments 112 and joiner device 120. FIG. 2A illustrates a top view and FIG. 2B illustrates a bottom view. Referring to FIG. 2A, track segments 112 have one or more track conductor elements 212 (e.g., electrical wiring) positioned along their respective sides and receptacles 220 coupled to their respective ends.

Each receptacle 220 includes a cavity 222 that defines an interior wall 228 between a top receptacle portion 224 and a bottom receptacle portion 226. Receptacle 220 also includes one or more mechanical connection elements 232 disposed in the cavity 222. Mechanical connection elements 232 include a pair of fasteners disposed on a bottom interior surface of receptacle 220, which couple to mating fasteners of joiner device 120 discussed below. Receptacle 220 further includes receptacle contacts 240 positioned along opposing sides of interior lateral wall 228. Receptacle contacts 240 are electrical contacts in electrical communication with corresponding track conductor elements 212. As discussed below, receptacle contacts 240 mechanically and electrically couple to corresponding joiner contacts 270 of a joiner device 120.

FIG. 2A also illustrates portions of joiner device 120 that mechanically and electrically connect or releasably secure track segments 112 together. As shown, joiner device 120 includes an elongated joiner body 250 that has a top joiner portion 254, a bottom joiner portion 256 (opposite top joiner portion 254), and a lateral wall 258 disposed therebetween. Joiner body 250 also includes protruding portions 252 formed at respective ends of the elongated body.

Protruding portions 252 are dimensioned to fit within cavity 222 of receptacle 220 to releasably secure joiner device 120 to receptacle 220 and thus, couple joiner device 120 to the track segment attached to receptacle 220. For example, joiner device 120 includes joiner contacts 270 positioned along a portion of lateral wall 258 that is associated with protruding portion 252. Joiner contacts 270 include electrical contacts that are mechanically biased in a laterally outward direction to releasably engage receptacle contacts 240. In operation, when protruding portion 252 slots or fits within cavity 222 of receptacle 220, joiner contacts 270 electrically and mechanically engage with receptacle contacts 240 of receptacle 220. Joiner contacts 270 exert an outward lateral force that releasably engages (electrically and mechanically) with receptacle contacts 240, to secure joiner device 120 to receptacle 220. While cavity 222 and protruding portion 252 are illustrated as having a generally square or rectangular mating configuration, it is appreciated that the mating configuration can include various lock-and-key shapes—e.g., circular, triangular, non-uniform/non-geometric shapes, etc.

Referring to FIG. 2B, protruding portion 252 of joiner device 120 includes one or more complimentary mechanical connectors 262 positioned on bottom joiner portion 256 and more specifically, on protruding portions 252. As discussed, complimentary mechanical connectors 262 releasably engage with corresponding mechanical connection elements 232 of receptacle 220 to mechanically secure joiner device 120 to receptacle 220. In some embodiments, complimentary mechanical connectors 262 and mechanical connection elements 232 generate a snapping or clicking sensation to provide tactile and/or audible feedback that indicates a proper engagement or a secure fit.

Joiner device 120 also has first and second end portions, generally designated as a first end portion 264 and a second end portion 266 (opposite the first end portion 264). As shown, first end portion 264 and second end portion 266 are associated with respective protruding portions 252, however it is appreciated that these end portions may have different and varied forms, as discussed below. It is also appreciated that joiner device 120 can include conductive elements that electrically couple first end portion 264 and second end portion 266 and more specifically, electrically couple joiner contacts 270 positioned at respective ends of joiner device 120. In this fashion, joiner device 120 forms a mechanical and electrical bridge between track segments.

FIGS. 2A and 2B also illustrate a cover 280 associated with joiner device 120. Cover 280 encapsulates receptacles 220 and joiner device 120 when joiner device 120 is coupled to receptacles 220. Cover 280 provides a planar surface that protects electrical and mechanical components and reinforces a low-profile aesthetic. In the examples of FIGS. 2A and 2B, joiner device 120 can couple with a first track segment 112 and a second track segment 112 in a substantially co-planar (e.g., flush) and substantially parallel arrangement relative to one another.

It is appreciated that various structures shown in FIGS. 2A-2B can be distinct components or integrally formed as part of other components. For example, receptacles 220 may be distinct components attached or otherwise coupled to the end of a track segment and/or they may be integrally formed as part of an end of the track segment. Likewise, mechanical connection elements 232 and complimentary mechanical connectors 262 can be distinct components coupled to or integrated with the respective receptacle 220 and joiner device 120. In addition, while the example design shown in FIGS. 2A and 2B includes two protruding portions 252, joiner device 120 can include any number of protruding portions for linking together multiple track segments and/or other components as discussed herein.

Figure 3:
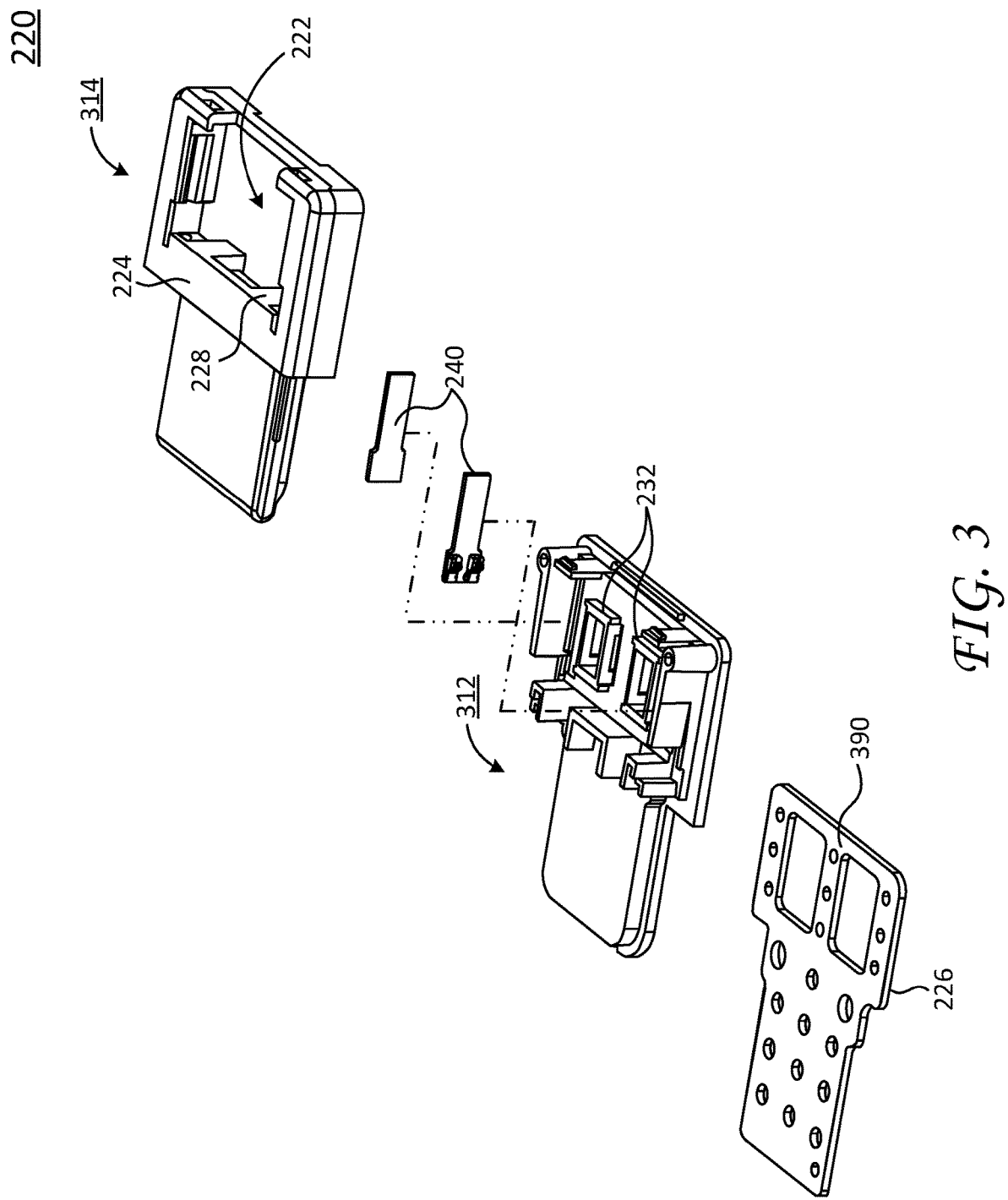
FIG. 3 illustrates an exploded isometric view of one end portion of a track segment shown in FIG. 2A.

FIG. 3 illustrates an exploded view of receptacle 220, which includes a cover portion 314, a base portion 312, and a structural plate 390. Notably, a top of cover portion 314 corresponds to top receptacle portion 224 and a bottom of structural plate 390 corresponds to bottom receptacle portion 226. As shown, cover portion 314 includes cavity 222, which defines interior wall 228. Cavity 222 and interior wall 228 collectively define a volume or space for receiving a corresponding portion of a joiner device e.g., protruding portion 252.

Base portion 312 couples with cover portion 314 and provides mechanical and electrical connections between receptacle 220 and a corresponding portion of a joiner device—e.g., protruding portion 252. Base portion 312 includes mechanical connection elements 232 and receptacle contacts 240 positioned on opposing lateral sides of base portion 312. In some examples, mechanical connection elements 232 are positioned along a bottom interior surface of receptacle 220 to establish mechanical connection with corresponding complimentary mechanical connectors (e.g., complimentary mechanical connectors 262) along a bottom joiner portion of a joiner device, thereby ensuring a secure mechanical connection between cavity 222 and a corresponding portion of a joiner device (e.g., protruding portion 252). Receptacle contacts 240 are positioned along the interior wall 228 of the cavity 222. These contacts can further include and/or be connected to electrical contact connectors to establish electrical communication with corresponding track conductor elements or wires. For example, in some embodiments, portions of receptacle contacts 240 extend through slots or pockets in the interior body of base portion 312 and cover portion 314 toward corresponding track conductor elements or wires, which are positioned along lateral sides of a track segment (e.g., track segment 112). In these embodiments, the electrical contact connectors on the receptacle contacts 240 electrically connect with corresponding track conductor elements or wires. Further, receptacle contacts 240 provide an electrical/mechanical contact surface along opposing medial sides of receptacle contacts 240 to establish electrical communication with corresponding joiner contacts of a joiner device (e.g., joiner device 120), thereby establishing electrical communication between track conductor elements of a track segment and corresponding joiner contacts of a joiner device.

Structural plate 390 generally defines bottom receptacle portion 226 and couples with a bottom side of base portion 312. Notably, structural plate 390 can provide a base structure for components of receptacle 220 and can be molded or integrated inside base portion 312.

Collectively, the component parts and design of receptacle 220 shown in FIG. 3 provide electrical and mechanical connections between a corresponding track segment (e.g., track segment 112) and a joiner device (e.g., joiner device 120) in a low-profile form. The generally lateral design and configuration shown in FIG. 3 contributes to the generally low-profile form by reducing the overall "height" profile of receptacle 220. In particular, the shape, size, and depth of cavity 222 receives a corresponding portion of a joiner device such that the top of the joiner device lies substantially flush or co-planar with top receptacle portion 224 (when secured together). When coupling receptacle 220 with a corresponding portion of a joiner device, mechanical connection elements 232 releasably couple with corresponding complimentary mechanical connectors (e.g., complimentary mechanical connectors 262) of the joiner device in a snap-fit engagement. As discussed herein, the fastening members (e.g., mechanical connection elements 232 and complimentary mechanical connectors 262) collectively generate an inward normal engaging force that mechanically couples receptacle 220 with a corresponding portion of a joiner device. Further, positioning receptacle contacts 240 along lateral sides of the interior wall 228 of the cavity 222 enable a low-profile form.

While fastening members (e.g., mechanical connection elements 232) shown in FIG. 3 illustrate part of one example mating configuration, it is appreciated that the fastening members are not limited to this configuration. For example, the illustrated complimentary male and female features may be interchanged on receptacle 220 and a corresponding joiner device. In addition, the fastening members and mating elements are not limited to a specific position disposed inside cavity 222. In other examples, the mating configuration can be defined by the dimension and shape of receptacle 220 and a corresponding joiner device, where cavity 222 can include mating "lips," "skirts," and other mating or contacting surfaces on around their respective perimeters such that the corresponding joiner device "clips" or "snaps" into cavity 222 of receptacle 220. It is also appreciated that in addition to the inward normal engaging force, the fastening members can further provide a lateral engaging force.

Similarly, while receptacle contacts 240 shown in FIG. 3 illustrate one example configuration, it is appreciated that the receptacle contacts 240 are not limited to this configuration. For example, the illustrated receptacle contacts 240, which may or may not include electrical contact connectors, can be alternatively arranged within the receptacle 220 and with respect to corresponding track conductor elements or wires. Further, electrical contact connectors can be distinct components that are attached or otherwise coupled to respective receptacle contacts 240 and/or may be integrally formed as part of receptacle contacts 240. Electrical contact connectors may be separable from respective receptacle contacts 240 and can be arranged within receptacle 220 such that electrical contact connectors abut against receptacle contacts 240.

It is appreciated that various structures shown in FIG. 3 can be distinct components or integrally formed as part of other components. For example, cover portion 314, base portion 312, and structural plate 390 may each be distinct components attached or otherwise coupled together to form receptacle 220 and/or may be integrally formed with one another as receptacle 220. Likewise, mechanical connection elements 232 and/or receptacle contacts 240 can be distinct components attached or otherwise coupled to receptacle 220 and/or may be integrally formed as part of receptacle 220. Regardless of the modifications, receptacle 220 generally defines an area or volume for receiving a corresponding portion of a joiner device and establishes electrical communication between track conductor elements and joiner contacts.

FIG. 4A shows an exploded perspective view of joiner device 120 generally viewed from a top side. Joiner device 120 includes a base portion 410, a top plate 460, and cover 280. Notably, a top side of top plate 460 (e.g., PCB) corresponds to top joiner portion 254 and a bottom side of base portion 410 corresponds to bottom joiner portion 256. Here, base portion 410 and top plate 460 generally define a joiner body having first end portion 264 and second end portion 266 associated with respective protruding portion(s) 252. Base portion 410 provides structural support for mechanically coupling track segments together; and top plate 460 can include printed circuit boards (PCBs), printed wire boards (PWBs), and so on that provide electrical connections between end portions (e.g., first end portion 264/second end portion 266) of joiner device 120. Cover 280 provides an exterior housing that is positioned over base portion 410 and top plate 460 to encapsulate components therein.

As shown, base portion 410 includes an elongated body having protruding portion(s) 252 positioned as respective ends—e.g., first end portion 264/second end portion 266. Protruding portions 252 include respective joiner contacts 270 positioned along lateral wall 258, which lateral wall extends along the length of the elongated body. As discussed, the illustrated protruding portions 252 have a generally square or rectangular configuration that fit within or mates within an interior volume defined by a cavity in the corresponding receptacle. Notably, portions of the elongated body that are immediately proximate to respective protruding portions 252 include a narrower width than the protruding portion.

In addition, base portion 410 can include raised walls, skirts, posts, etc. that define a seat configured to receive top plate 460. When top plate 460 is positioned in the seat, joiner contacts 270 electrically couple with portions of top plate 460 (e.g., with electrical traces in the PCB/PWB); further, a top of top plate 460 can be substantially flush or co-planar with a top of base portion 410 when coupled together.

As discussed, joiner contacts 270 generally establish electrical communication between top plate 460 and the receptacle contacts for a corresponding receptacle (e.g., receptacle contacts 240), while simultaneously exerting an outward lateral force to releasably engage with the receptacle contacts. Notably, outer portions of joiner contacts 270 form a "spring" or tensioning portion that exerts an outward lateral force when compressed—e.g., an outward force in a lateral direction that pushes away from lateral wall 258. In operation, these tensioning portions releasably engage with corresponding receptacle contacts of a receptacle—e.g., receptacle contacts 240. In other words, when joiner device 120 couples with a corresponding receptacle, joiner contacts 270 compress against corresponding electrical receptacle contacts to establish electrical and mechanical engagement between joiner device 120 and the corresponding receptacle. This outward lateral force improves electrical and mechanical engagement between joiner device 120 and the corresponding receptacle by centering the protruding portion 252 of joiner device 120 within a cavity of the receptacle (e.g., cavity 222).

Figure 4B:
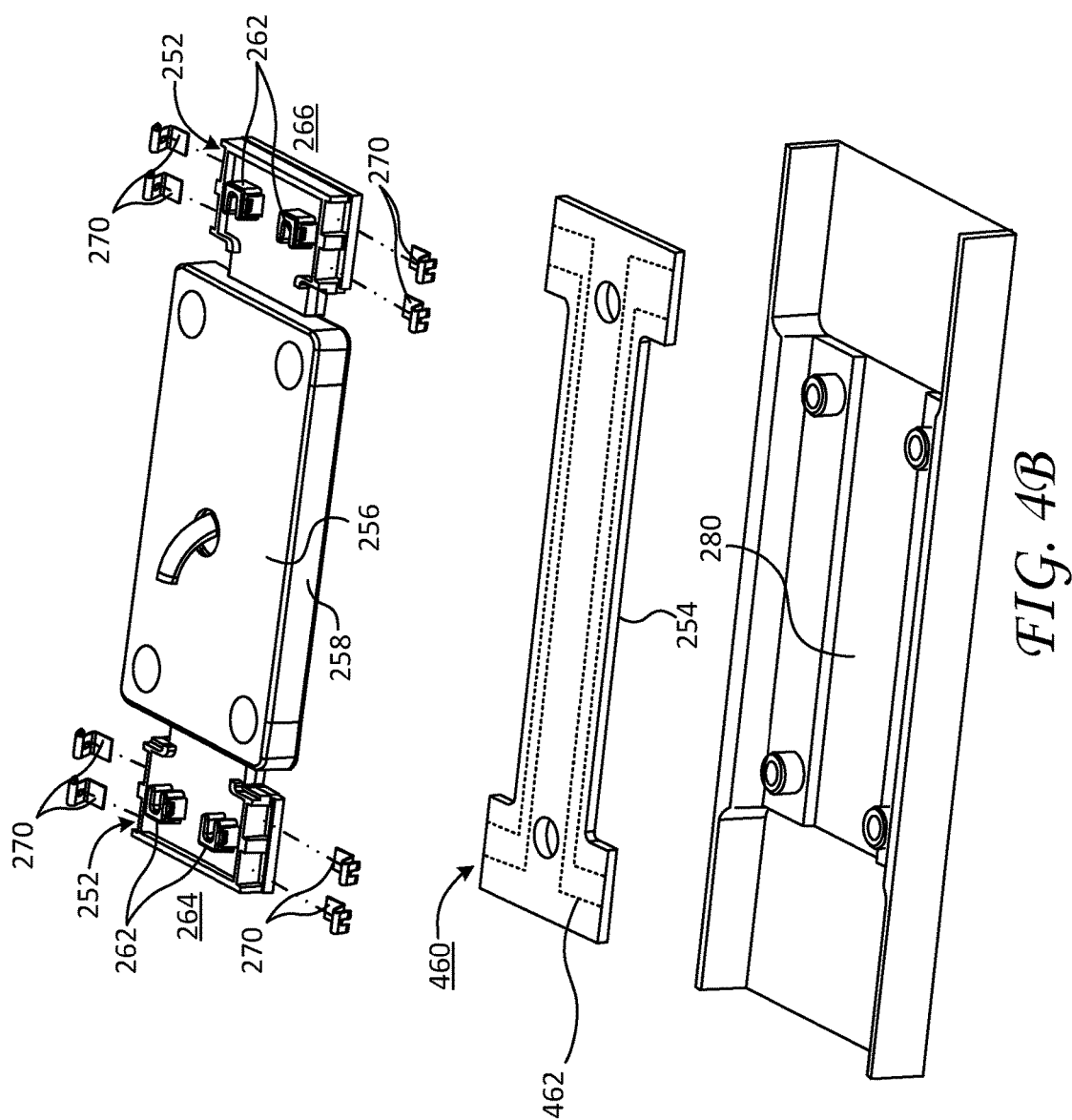
FIG. 4B illustrates an exploded perspective view of the joiner device shown in FIG. 4A generally viewed from a bottom side.

FIG. 4B shows an exploded bottom view of joiner device 120 generally viewed from a bottom side. Joiner device 120 includes base portion 410, top plate 460, joiner contacts 270, and cover 280. Joiner device 120 includes complimentary mechanical connectors 262 along respective protruding portion(s) 252 to establish mechanical connection with corresponding mechanical connection elements (e.g., mechanical connection elements 232) along a bottom interior surface of a receptacle, thereby ensuring a secure mechanical connection between protruding portion 252 and a corresponding cavity (e.g., cavity 222) of the receptacle. In some examples, complimentary mechanical connectors 262 are positioned along a bottom surface of bottom joiner portion 256. When coupling joiner device 120 with a corresponding receptacle, protruding portion 252 inserts into a corresponding cavity of the receptacle such that the bottom surface of bottom joiner portion 256 contacts a bottom interior surface of the cavity and complimentary mechanical connectors 262 engage respective mechanical connection elements disposed along the bottom interior surface of the cavity to generate an inward normal engaging force that mechanically couples joiner device 120 with a corresponding receptacle.

Top plate 460 includes electrical traces 462 that provides electrical connections between respective ends—e.g., first end portion 264/second end portion 266 of joiner device 120. Electrical traces 462 of top plate 460 accommodate power and/or data transfer between respective ends of joiner device 120. In some examples, top plate 460 includes a PCB, PWB, or another suitable component for establishing electrical connections between respective ends of joiner device 120. Top plate 460 can couple and establish electrical connection with joiner contacts 270. Here, electrical traces 462 are positioned along a bottom surface of top plate 460; as such, a portion of each joiner contact 270 contacts the bottom surface of top plate 460 to establish electrical connection with each joiner contact 270 and associated electrical traces 462 of top plate 460. In a preferred embodiment, each joiner contact 270 is soldered to the top plate 460. It is appreciated that electrical traces 462 can be positioned along any surface of top plate 460, and may include contact traces at first end portion 264 and second end portion 266 for coupling directly with joiner contacts 270. Portions of electrical traces 462 may be encased underneath a protective layer of top plate 460. Top plate 460 can be a PCB or PWB with electrical traces 462 being integrally formed or otherwise printed thereon; alternatively, top plate 460 can be a supporting structure that defines electrical traces 462 in the form of wires or another suitable conducting element.

Here, cover 280 includes an inner cover surface that accommodates the base portion 410 and top plate 460; inner cover surface couples with base portion 410 at engagement apertures that align with corresponding corner apertures of base portion 410.

Collectively, the component parts and design of joiner device 120 shown in FIGS. 4A and 4B enable releasable electrical and mechanical connection between a corresponding track segment (e.g., track segment 112) coupled to a receptacle (e.g., receptacle 220) and another component in a low-profile form. Joiner device 120 can act as a bridge that electrically and mechanically couples a receptacle with another component. In particular, the shape, size and height of protruding portion(s) 252 insert into a corresponding cavity of the receptacle such that the top of the joiner device 120 is substantially flush or co-planar with a top receptacle portion of the receptacle when engaged. When coupling joiner device 120 with a corresponding cavity of the receptacle, complimentary mechanical connectors 262 couple with corresponding mechanical connection elements (e.g., mechanical connection elements 232) of the receptacle in a snap-fit engagement. Fastening members (e.g., complimentary mechanical connectors 262 and mechanical connection elements 232) collectively generate an inward normal engaging force that mechanically couples joiner device 120 with a corresponding receptacle to comply with industry standards while maintaining a low-profile form. Further, joiner contacts 270 enable a low-profile form by being positioned along lateral wall 258 at protruding portions 252 to couple with corresponding receptacle contacts (e.g., receptacle contact 240) of the receptacle both electrically and mechanically, while exerting an outward lateral force against the corresponding receptacle contacts to center the joiner device 120 within the receptacle and communicate power and/or data between the joiner device 120 and the receptacle.

While fastening members (e.g., complimentary mechanical connectors 262) shown in FIG. 4B illustrate part of one example mating configuration, it is appreciated that the fastening members are not limited to this configuration. For example, the illustrated complimentary male and female features may be interchanged on joiner device 120 and a corresponding receptacle. In addition, the fastening members and mating elements are not limited to a specific position disposed along base portion 410. In other examples, the mating configuration can be defined by the dimension and shape of protruding portion 252 and a corresponding receptacle, where protruding portion 252 can include mating "lips," "skirts," and other mating or contacting surfaces on around their respective perimeters such that the joiner device 120 "clips" or "snaps" into a cavity of the corresponding receptacle. It is also appreciated that in addition to the inward normal engaging force, the fastening members can further provide a lateral engaging force.

Similarly, while joiner contacts 270 shown in FIGS. 4A and 4B illustrate one example configuration, it is appreciated that joiner contacts 270 are not limited to this configuration. For example, the illustrated joiner contacts 270 can be alternatively arranged along the base portion 410 and with respect to corresponding electrical traces 462 of top plate and/or corresponding receptacle contacts (e.g., receptacle contacts 240) of a receptacle.

While the example of joiner device 120 in FIGS. 4A and 4B shows base portion 410 having end portions (e.g., first end portion 264/second end portion 266) in a substantially parallel arrangement relative to one another, other examples of joiner device 120 can have other arrangements. For example, a joiner device can include more than two end portions; in another example, a joiner device can have an elongated body that has a bend where respective end portions of the elongated body can be in a substantially non-parallel arrangement relative to one another.

While the specific example of joiner device 120 shown in FIGS. 4A and 4B include a number of individual component parts, it is appreciated that various modifications within the scope of this disclosure are possible, including integrating individual components into parts of a larger structure. Importantly and regardless of the modifications, joiner device 120 generally provides a bridge for releasably mechanically and electrically coupling a track segment with another component.

Figure 5B:
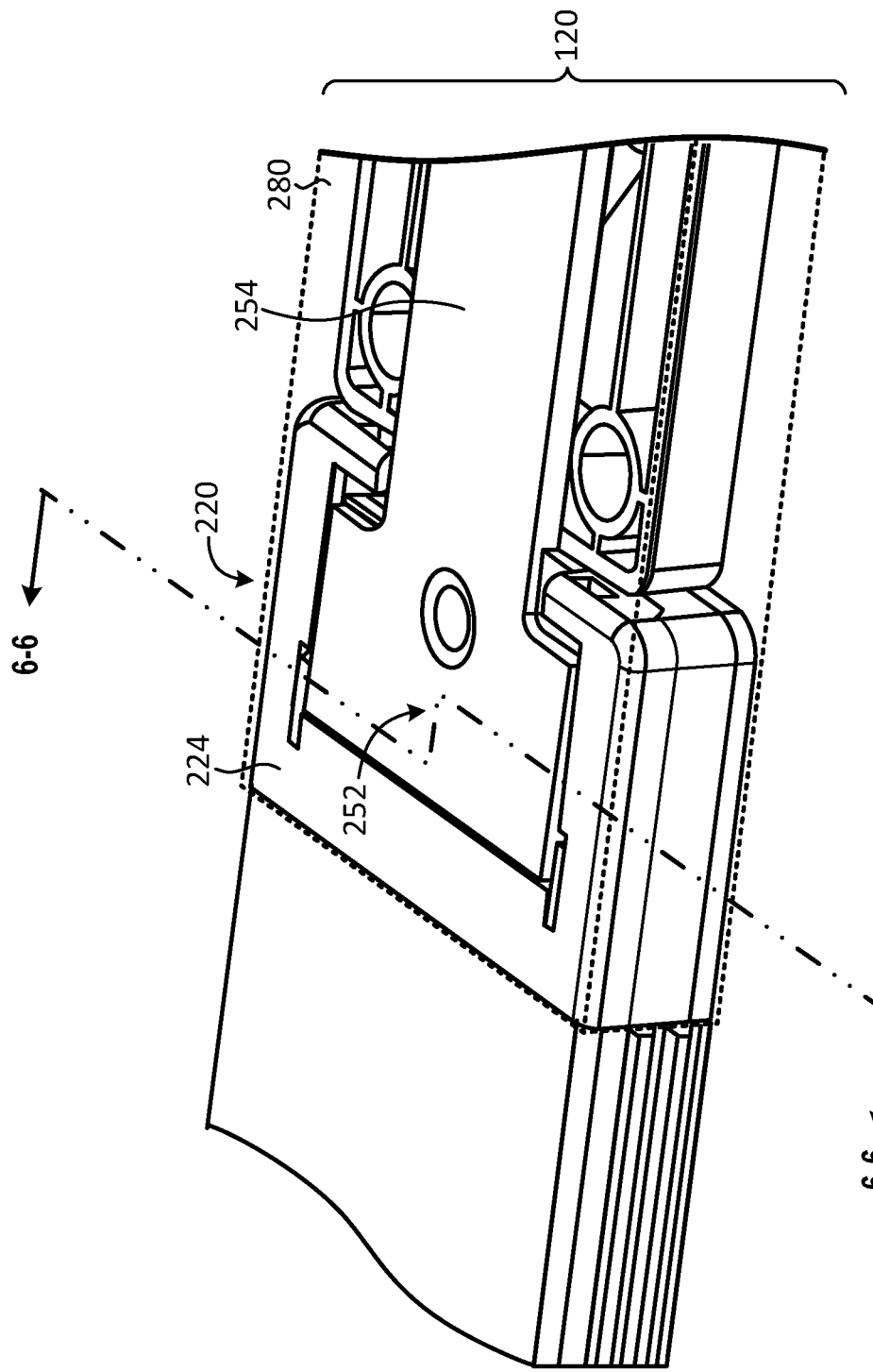
FIG. 5B illustrates a perspective view of the joiner device releasably engaged with the end portion of the track segment shown in FIG. 5A.

FIG. 5A and FIG. 5B illustrate an operation to engage or releasably couple joiner device 120 with receptacle 220, where FIG. 5A illustrates joiner device 120 aligned with receptacle 220 prior to engagement and FIG. 5B illustrates joiner device 120 engaging with receptacle 220. Referring to FIG. 5A, protruding portion 252 of joiner device 120 aligns with cavity 222 of receptacle 220 such that joiner contacts 270 align with receptacle contacts 240 of receptacle 220. In a further aspect, fastening members (e.g., mechanical connection elements 232 of receptacle 220 and complimentary mechanical connectors 262 of joiner device 120) align with one another. Joiner device 120 couples with receptacle 220, by insertion of protruding portion 252 of joiner device 120 into cavity 222 of receptacle 220 along an inward-pointing normal direction A relative to a bottom interior surface of cavity 222 of receptacle 220 as shown. In the examples shown, receptacle 220 is coupled with track segment 112.

FIG. 5B shows joiner device 120 releasably coupled with receptacle 220 with cover 280 shown in dash lines. A cavity (e.g., cavity 222) of receptacle 220 receives protruding portion 252 of joiner device 120 such that the top joiner portion 254 of the joiner device 120 is substantially flush or co-planar with top receptacle portion 224 when engaged. Corresponding joiner contacts of joiner device 120 electrically couple with receptacle contacts 240 of receptacle 220 and exert first and second lateral forces against electrical receptacle contacts 240 to maintain releasable electrical and mechanical engagement between joiner device 120 and receptacle 220 as discussed herein.

Figure 6:
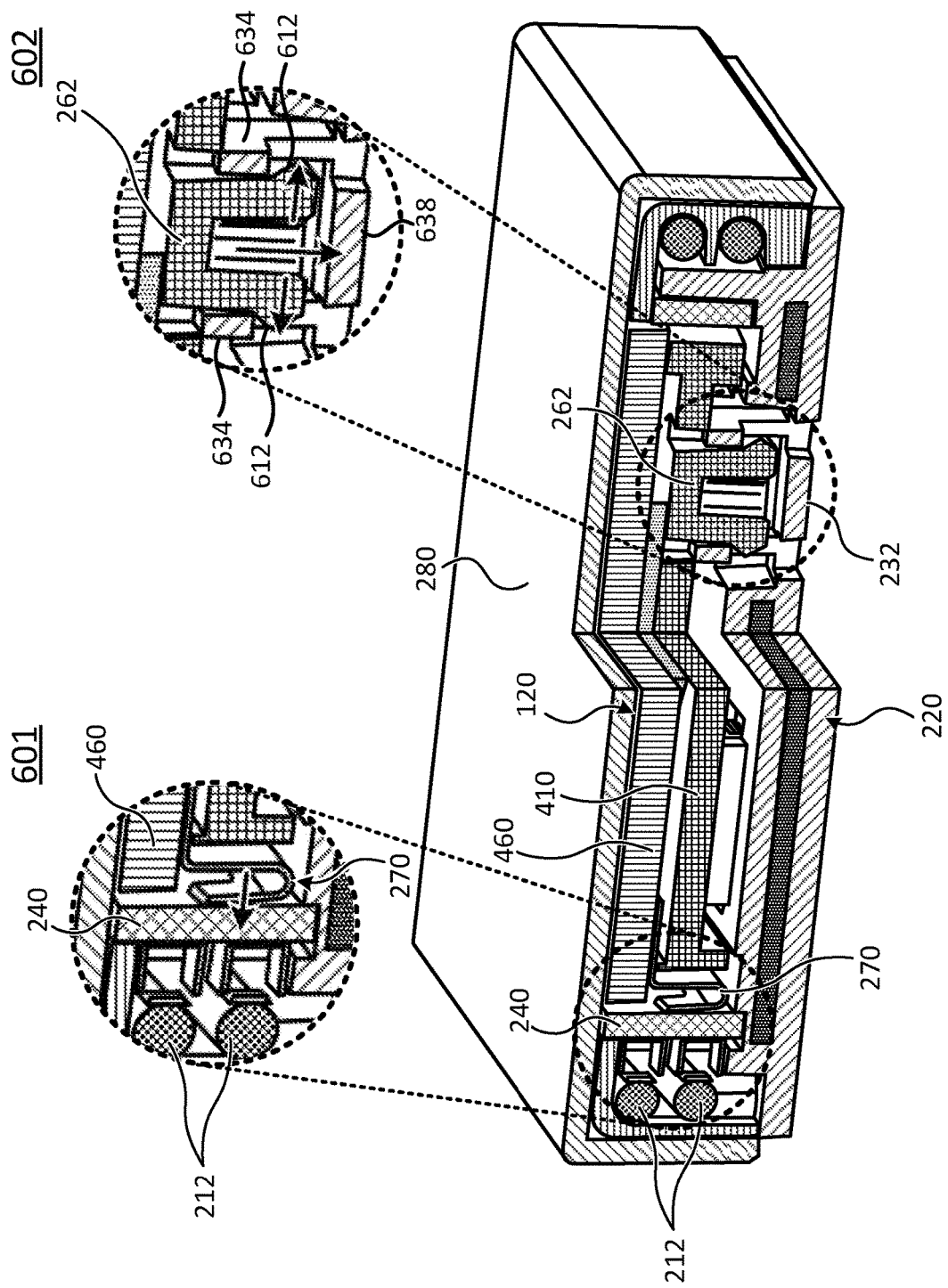
FIG. 6 illustrates a partial isometric cross-sectional view of the joiner device releasably engaged with the end portion of the track segment viewed along cut-line 6-6 in FIG. 5B.

FIG. 6 shows a cross-sectional view of the joiner device 120 releasably engaged with receptacle 220, where enlarged portions designated by 601 and 602 highlight respective engagement forces between the components.

Referring to enlarged portion 601, receptacle contact 240 of receptacle 220 electrically communicates with track conductor elements 212, which can be positioned lateral to receptacle contact 240. As shown, receptacle contact 240 includes electrical contact connectors that electrically couple track conductor elements 212 to receptacle contacts 240. Receptacle contact 240 electrically communicates with joiner contact 270 of joiner device 120, which in turn electrically communicates with top plate 460 of joiner device 120, thereby establishing a secure electrical connection between track conductor elements 212 and top plate 460.

As discussed, joiner contact 270 forms a spring or tensioning portion that electrically couples with and exerts an outward lateral force against receptacle contact 240 mechanically and electrically secure the joiner device 120 within receptacle 220. The outward lateral force exerted against receptacle contact 240 by joiner contact 270 improves electrical and mechanical engagement between joiner device 120 and receptacle 220 by centering the joiner device 120 within receptacle 220. As shown, joiner contact 270 can generally define a planar portion opposite from tensioning portion; planar portion of joiner contact 270 contacts a surface of top plate 460 to provide electrical connection between joiner contact 270 and top plate 460. The generally lateral design and configuration shown in FIG. 6 contributes to the generally low-profile form by reducing an overall "height" profile of receptacle 220 and joiner device 120.

Referring to enlarged portion 602, fastening members mechanically secure joiner device 120 to receptacle 220, where mechanical connection element 232 of receptacle 220 engages with corresponding complimentary mechanical connector 262 of joiner device 120. In some embodiments, complimentary mechanical connectors 262 and mechanical connection elements 232 generate a snapping or clicking sensation during engagement to provide tactile and/or audible feedback that indicates a proper engagement or a secure fit. Collectively, fastening members of receptacle 220 and joiner device 120 generate an additional mechanical securing force—e.g., an inward-pointing normal force—in a direction orthogonal to the outward lateral force exerted by the joiner contact 270. It is also appreciated that in addition to the inward normal engaging force, the fastening members can further provide a lateral engaging force.

The cross-sectional view illustrates mating elements of mechanical connection element 232 that couple with respective surfaces of complimentary mechanical connector 262. Collectively, these mating elements include a pair of side elements 634 and a bottom element 638. In one example shown in FIG. 6, complimentary mechanical connector 262 provides an outward angled surface that exerts an outward lateral force against side elements 634 when joiner device 120 engages with receptacle 220. Put differently, when joiner device 120 is pushed "down" to engage with receptacle 220, the outward angled surface of complimentary mechanical connector 262 contacts with side elements 634. During the downward movement, the outward angled surface side elements 634 slides along corresponding portions of side elements 634 which complimentary mechanical connector are temporarily pushed outward. Once the outward angled surface clears the corresponding portions of side elements 634, the side elements 634 complimentary mechanical connector relax as the outward angled surface "clicks" or "snaps into" into receptacle 220, where the outward angled surfaces extend into corresponding slots of mechanical connection element 232. Further, following engagement of mechanical connection element 232 with complimentary mechanical connector 262, the outward lateral force from complimentary mechanical connector 262 translates into an inward normal engaging force (orthogonal to the direction of the lateral force) to mechanically secure joiner device 120 and receptacle 220. complimentary mechanical connector mechanical connection element Collectively, the lateral arrangement of track conductor elements 212, receptacle contacts 240, joiner contacts 270, and top plate 460 shown in FIG. 6 contributes to a low-profile form of joiner device 120 and corresponding receptacle 220, which can be coupled to a track segment (e.g., track segment 112) to provide electrical and mechanical connections between the track segment and another component through joiner device 120. Joiner contacts 270 exert an outward lateral force to releasably engage receptacle contact 240 and ensure a secure mechanical and electrical connection between the joiner device 120 and the receptacle 220; the mechanical connection elements 232 and complimentary mechanical connectors 262 exert orthogonal engaging forces to mechanically secure joiner device 120 and receptacle 220.

While FIG. 6 shows outward lateral forces exerted by complimentary mechanical connector mating element 612 being in a generally parallel arrangement with respect to outward lateral forces exerted by joiner contact 270, it is appreciated that outward lateral forces exerted by complimentary mechanical connector mating element 612 can be in a substantially parallel or substantially non-parallel arrangement with respect to outward lateral forces exerted by joiner contact 270. For example, outward lateral forces exerted by complimentary mechanical connector mating element 612 can extend in a direction parallel to track conductor elements 212 while remaining substantially coplanar with respect to outward lateral forces exerted by joiner contact 270 such that the inward normal engaging force collectively exerted by fastening members is substantially orthogonal to outward lateral forces exerted by joiner contact 270. In other examples, outward lateral forces exerted by complimentary mechanical connector mating element 612 can extend in a direction that is both non-parallel to track conductor elements 212 and non-parallel to outward lateral forces exerted by joiner contact 270, while remaining substantially coplanar with respect to outward lateral forces exerted by joiner contact 270 such that the inward normal engaging force collectively exerted by fastening members is substantially orthogonal to outward lateral forces exerted by joiner contact 270.

While fastening members (e.g., mechanical connection elements 232 and complimentary mechanical connectors 262) shown in FIG. 6 illustrate part of one example mating configuration, it is appreciated that the fastening members are not limited to this configuration. For example, the illustrated complimentary male and female features may be interchanged on receptacle 220 and joiner device 120. In addition, the fastening members and mating elements are not limited to a specific position disposed inside receptacle 220 or along joiner device 120. In other examples, the mating configuration can be defined by the dimension and shape of receptacle 220 and joiner device 120, where receptacle 220 and/or joiner device 120 can include mating "lips," "skirts," and other mating or contacting surfaces on around their respective perimeters such that the corresponding joiner device 120 "clips" or "snaps" into receptacle 220. It is also appreciated that in addition to the inward normal engaging force, the fastening members can further provide a lateral engaging force as discussed above.

FIGS. 7A-7F illustrate various configurations of joiner devices 710-760 that can be included in the low-profile track system 100 for modularity. While previous examples discussed herein show joiner devices (e.g., joiner device 120) having two protruding portions configured to engage two receptacles that are substantially parallel with one another, joiner devices 710-760 can be configured to engage any number of receptacles that may be substantially parallel, substantially non-parallel, substantially coplanar/flush, and/or substantially non-coplanar.

FIG. 7A, for example, shows a three-way joiner device 710 having a first protruding portion 712A, a second protruding portion 712B and a third protruding portion 712C for engagement with three receptacles (not shown). Three-way joiner device 710 can include a three-way cover 714, a three-way top plate 716, and a three-way base portion 718 as shown. Electrical traces of three-way top plate 716 communicate power and/or data between first protruding portion 712A, second protruding portion 712B and third protruding portion 712C.

FIG. 7B shows a four-way joiner device 720 having a first protruding portion 722A, a second protruding portion 722B, a third protruding portion 722C, and a fourth protruding portion 722D for engagement with four receptacles (not shown). Four-way joiner device 720 can include a four-way cover 724, a four-way top plate 726, and a four-way base portion 728 as shown. Electrical traces of four-way top plate 726 communicate power and/or data between first protruding portion 722A, second protruding portion 722B, third protruding portion 722C, and fourth protruding portion 722D.

FIG. 7C shows a coplanar bend joiner device 730 having a first protruding portion 732A and a second protruding portion 732B and defining a 90-degree bend along a body of coplanar bend joiner device 730 as shown for engagement with two receptacles that are oriented along a substantially common plane (e.g., coplanar or flush) but are orthogonal (and as a result, substantially non-parallel) relative to one another. Coplanar bend joiner device 730 can include a coplanar bend cover 734, a coplanar bend top plate 736, and a coplanar bend base portion 738 as shown. Electrical traces of coplanar bend top plate 736 communicate power and/or data between first protruding portion 732A and second protruding portion 732B. While the example shows a 90-degree bend, coplanar bend joiner device 730 can define any suitable non-parallel angle, such as a 30-degree bend, a 45-degree bend, a 60-degree bend, and variations thereon, such that a first track segment associated with the first protruding portion 732A and a second track segment associated with the second protruding portion 732B are substantially non-parallel with one another.

Figure 7D:
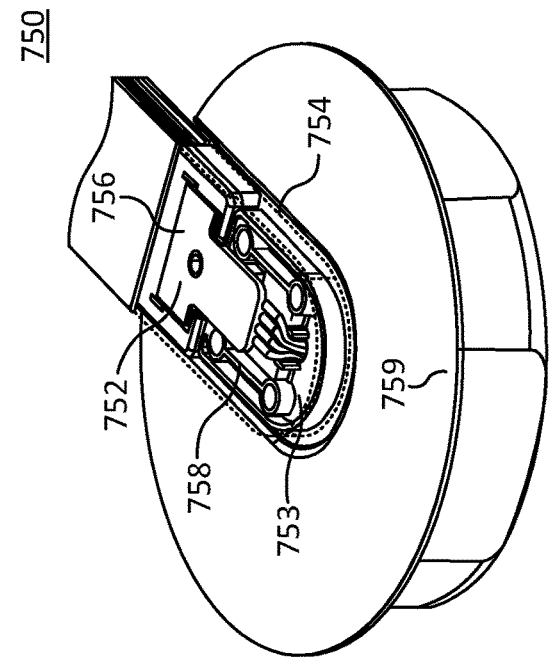
FIG. 7D illustrates a perspective view of a joiner device having a 2-way connector arrangement with a non-planar 90 degree bend.

FIG. 7D shows a non-coplanar bend joiner device 740 having a first protruding portion 742A and a second protruding portion 742B and defining a 90-degree bend along a central body portion of non-coplanar bend joiner device 740 as shown for engagement with a first receptacle and a second receptacle that are substantially non-coplanar (e.g., oriented along planes that are at an angle relative to one another, such as between a wall and a ceiling, a wall and a floor, or a first wall and a second wall). Non-coplanar bend joiner device 740 can include a non-coplanar bend cover 744, a non-coplanar bend top plate 746, and a non-coplanar bend base portion 748 as shown. Electrical traces of non-coplanar bend top plate 746 communicate power and/or data between first protruding portion 742A and second protruding portion 742B; in one example, non-coplanar bend top plate 746 can include a ribbon connector between first protruding portion 742A and second protruding portion 742B as shown. Non-coplanar bend base portion 748 can include a first base portion 749A and a second base portion 749B that are separable from one another for individual placement along respective are non-coplanar surfaces. While the example shows a 90-degree bend, non-coplanar bend joiner device 740 can define any suitable non-parallel angle, such as a 30-degree bend, a 45-degree bend, a 60-degree bend, and variations thereon, such that a first track segment associated with the first protruding portion 742A and a second track segment associated with the second protruding portion 742B are non-parallel and non-coplanar with one another.

Figure 7E:
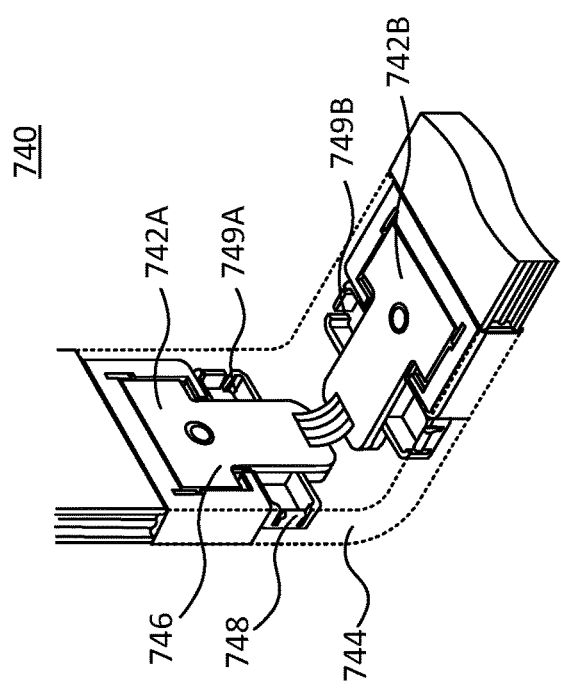
FIG. 7E illustrates a perspective view of a joiner device having a junction box.

FIG. 7E shows an end feed joiner device 750 having a first end portion defining a protruding portion 752 and having a second end portion that defines an end feed portion 753. The end feed portion 753 can be configured for engagement with a junction box 759 which can be positioned within a wall, ceiling, floor or another surface. Power feed lines in communication with the first end portion can feed into a central aperture associated with the second end portion as shown. End feed joiner device 750 can include end feed joiner cover 754, an end feed top plate 756, and an end feed base portion 758 as shown. Electrical traces of end feed top plate 756 communicate power and/or data between first end portion and second end portion.

Figure 7F:
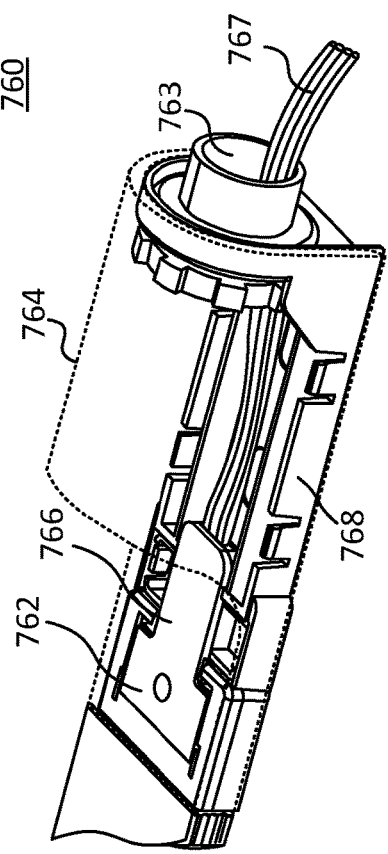
FIG. 7F illustrates a perspective view of a joiner device having a surface mount conduit power feed connector.

FIG. 7F shows a feed line joiner device 760 having a first end portion defining a first protruding portion 762 and having a second end portion that terminates in a surface mount conduit power feed connector 763 as shown. Power feed lines 767 can continue from the first end portion in an axial direction through the surface mount conduit power feed connector 763 at another electronic component and may enter a wall, ceiling or floor. Feed line joiner device 760 can include a feed line joiner cover 764, a feed line top plate 766, and a feed line base portion 768 as shown. Electrical traces of feed line top plate 766 communicate power and/or data between first end portion and second end portion, which may terminate at a power feed line. Surface mount conduit power feed connector 763 can include a Romex® connector or another suitable connector commonly employed in electrical systems.

In another example, a joiner device can couple with a standard electrical connector that "plugs" into a wall socket or another suitable power source. Associated power lines can be formed as part of a PCB/PWB, or can include coaxial cables, shielded and/or armored cables, ribbon connectors, or any suitable conductor type.

Figure 8A:
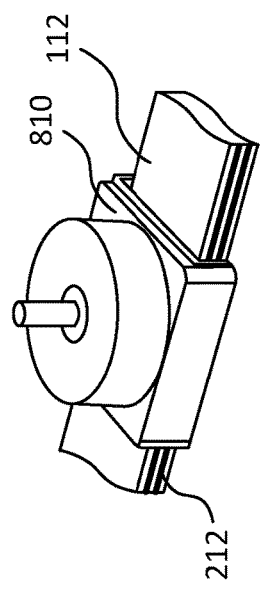
FIGS. 8A-8C illustrate respective isometric views of exemplary low-profile fixtures coupled to a portion of a track segment.
Figure 8B:
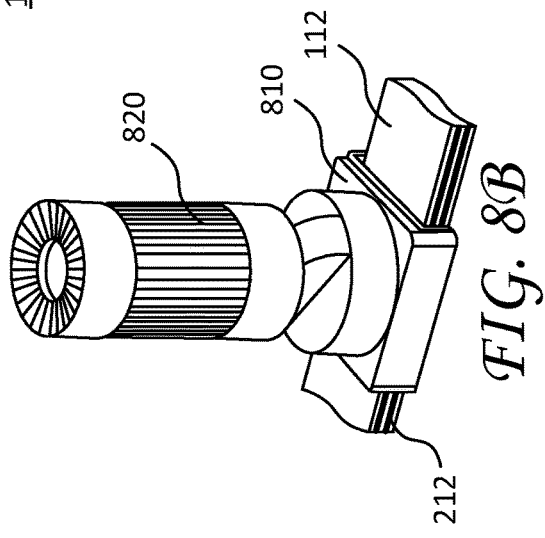
Figure 8C:
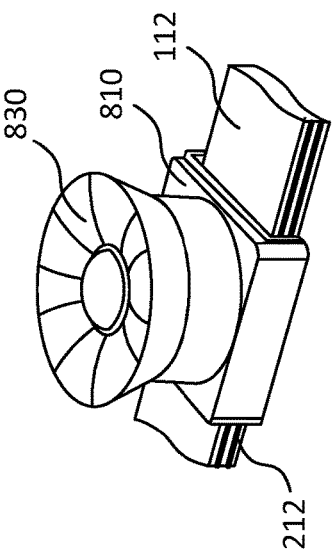

FIGS. 8A-8C show various fixtures associated with low-profile track system 100. For instance, FIG. 8A shows a carriage fixture 810 that couples with track segment 112 of the low-profile track system 100; carriage fixture 810 contacts track conductor elements 212 along the track segment 112 to receive power and/or data from track conductor elements 212. Carriage fixture 810 can be configured to receive other fixtures for coupling with the track segment 112.

FIG. 8B shows a fixture 820 that couples with track segment 112 of the low-profile track system 100 to receive power and/or data from track conductor elements 212. As shown, fixture 820 can couple with track segment 112 at carriage fixture 810. The fixture 820 can be a light, a camera, a sensor, or another similar fixture suitable for mounting along the low-profile track system 100.

FIG. 8C shows a fixture 830 coupled along track segment 112 of the low-profile track system 100 to receive power and/or data from track conductor elements 212. In the example shown, the fixture 830 can be a speaker of an audio system.

In other examples, fixtures that can couple with track segment 112 of the low-profile track system 100 can also include internet network components such as a router, modem, node, or another internet network component. Fixtures can also include security components such as cameras, motion, sound or light sensors, alarms, communication elements, and the like.

Figure 9:
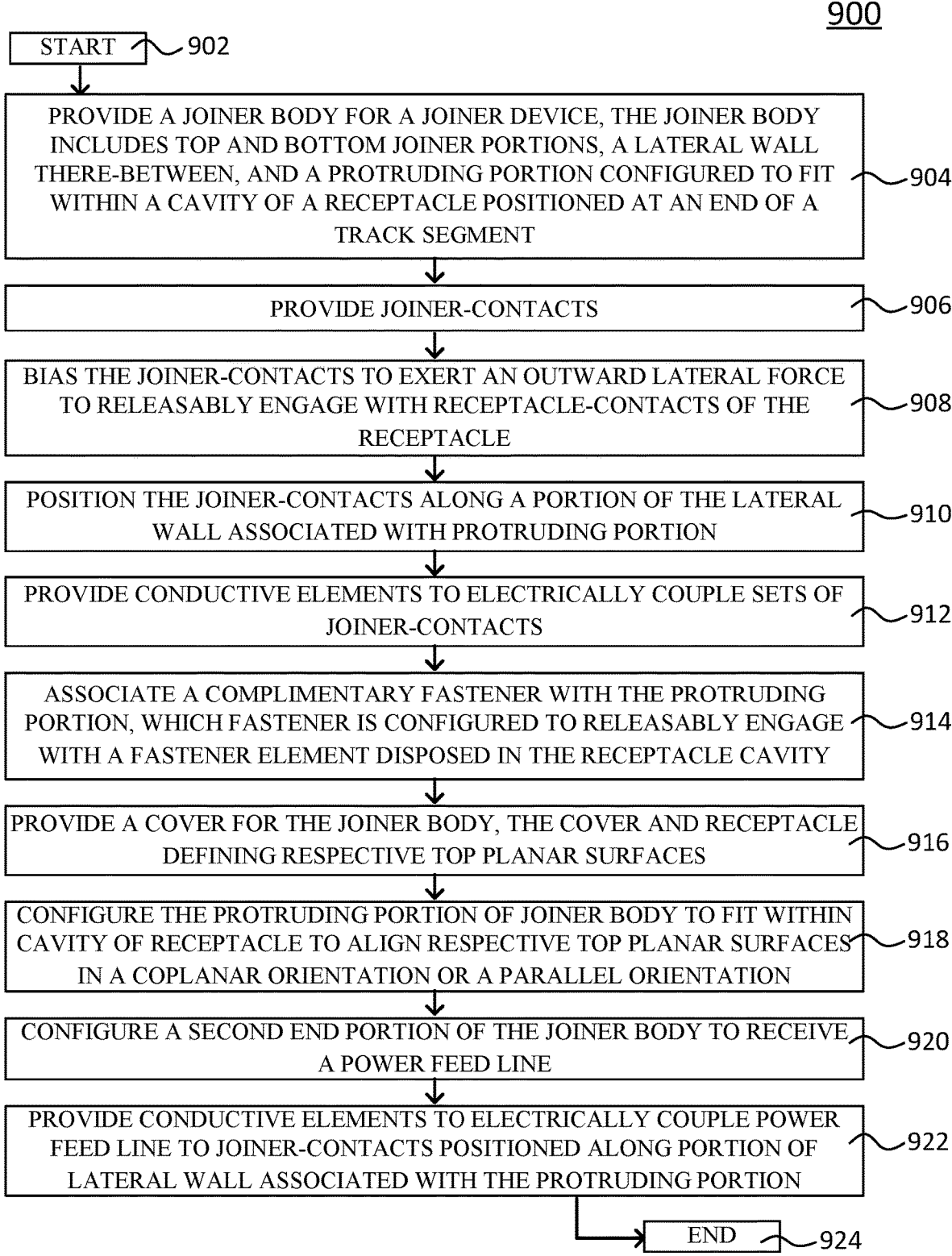
FIG. 9 illustrates an example simplified procedure for making a joiner device in a low-profile track system.

FIG. 9 illustrates an example simplified procedure 900 for making a joiner device in a low-profile track system. Procedure 900 starts at step 902 and continues on to step 904 where the procedure provides a joiner body for a joiner device.

In particular, step 904 describes providing a joiner body that includes a top joiner portion, a bottom joiner portion opposite the top joiner portion, and a lateral wall disposed therebetween. In addition, the joiner body includes a protruding portion configured to fit within a cavity of a receptacle positioned at an end of a track segment. In some embodiments, the joiner body can optionally include, for example, a base portion that generally defines the bottom joiner portion and the lateral wall and provides structural support for a top plate. The top plate can include electrical traces or other conducting elements that electrically couple portions of the joiner device together; for example, the top plate can include a PCB/PWB having a first end portion and a second end portion, where the first end portion is electrically coupled with the second end portion. In addition, the joiner body can also include one or more end portions that can couple to ends of track segments (e.g., FIGS. 2A-B, 5A-5B, 7A-7C), power feed lines (e.g., FIG. 7F), junction boxes (e.g., FIG. 7E), and so on.

As shown in steps 906-910, process 900 provides joiner contacts (906), biases the joiner contacts (908), and positions the joiner contacts along a portion of the lateral wall of the joiner body (910). In particular, step 908 describes biasing the joiner contacts to exert an outward lateral force to releasably engage with corresponding receptacle contacts of a track segment. Notably, the joiner contacts can include a conducting material and a tensioning portion that exerts the outward lateral force to releasably engage with electrical receptacle contacts of the receptacle. Step 910 further describes positioning the joiner contacts along a portion of the lateral wall associated with the protruding portion.

As discussed, in some examples, the joiner contacts can include one or more sets of joiner contacts, where a first set of joiner contacts and a second set of joiner contacts are positioned along respective first and second end portions of the joiner body. Notably, in these examples, process 900 can further include step 912, which provides conductive elements to electrically couple the sets of joiner contacts.

Process 900 next describes a step to associate a complimentary mechanical connector with the protruding portion in step 914. Here, step 914 associates the complimentary mechanical connector with the protruding portion, where the complimentary mechanical connector is configured to releasably engage with a mechanical connection element disposed in the cavity of the receptacle. In some examples, the complimentary mechanical connector exerts an inward-pointing normal force (e.g., orthogonal to the outward lateral force of the joiner contacts) to maintain the mechanical connection between the joiner device and the receptacle. As such, complimentary mechanical connector can include a strong material capable of slight deformation that returns to a default position such that the complimentary mechanical connector can engage the corresponding receptacle fastener in a snap-fit engagement.

As shown in step 916, process 900 can include providing a cover for the joiner body, wherein the cover and the receptacle define respective top planar surfaces. As further shown in step 918, process 900 can include configuring the protruding portion of the joiner body to fit within the cavity of the receptacle to substantially align the respective top planar surfaces in at least one of a coplanar orientation or a parallel orientation. The joiner device can be configured to releasably couple with the receptacle by insertion of the protruding portion within the cavity of the receptacle such that the joiner contacts releasably engage with electrical receptacle contacts of the receptacle and the complimentary mechanical connector releasably engages with a corresponding mechanical connection element. FIGS. 5A, 5B and 6 illustrate one such arrangement. When the joiner device and receptacle are releasably coupled together, the joiner contacts exert an outward lateral force to releasably engage with electrical receptacle contacts of the receptacle. In addition, the complimentary mechanical connector and mechanical connection element of a corresponding receptacle exert a force in a direction orthogonal to the outward lateral force exerted by the joiner contacts.

Step 920 of process 900 describes an optional step to configure a second end portion of the joiner body to receive a power feed line and step 922 describes providing conductive elements to electrically couple the power feed line to the joiner contacts positioned along the portion of the lateral wall associated with the protruding portion. Two such arrangements are shown in FIGS. 7E and 7F. Process 900 ends at step 924. It should be noted that various steps within process 900 may be optional, and further, the steps shown in FIG. 9 are merely examples for illustration—certain other steps may be included or excluded as desired. Further, while a particular order of the steps is shown, this ordering is merely illustrative, and any suitable arrangement of the steps may be utilized without departing from the scope of the embodiments herein. In addition, although process 900 is described with respect to providing, positioning, coupling, and etc. elements or components together, it is appreciated that the various components of the joiner device can be integrally formed and/or include distinct components that are coupled together or otherwise attached together.

Collectively, the devices, apparatus, and systems described herein, therefore, provide low-profile track lighting solutions suitable for any environment or space (e.g., residential houses, commercial buildings, etc.) and particularly address issues present in conventional lighting fixtures, which can only be positioned in a room or space based on the length of its electrical cord. The track lighting systems and devices disclosed herein also address the often bulky and large form factor required by conventional track-lighting systems by providing low-profile connectors that leverage dual mechanical and electrical/mechanical connectors to achieve sleek, low-profile form factors.

While there have been shown and described illustrative embodiments of the low-profile track lighting systems, showing specific movements, engagements, orientations, and views, it is to be understood that various other adaptations and modifications may be made within the spirit and scope of the embodiments herein. For example, the various embodiments have been shown and described herein as having specific features, however such features may be interchangeably included (or excluded) from any of the embodiments disclosed herein. It is also appreciated that the various discrete components or component parts of structures described herein can readily be incorporated or integrated into a larger structure. It is also appreciated that while some embodiments include a plurality or pairs of components (e.g., fasteners or mechanical connectors), it is appreciated that a single component can be used with departing from the spirit and scope of this disclosure.

The foregoing description has been directed to specific embodiments. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A low-profile track system, comprising:
  a receptacle positioned at an end of a track segment, the receptacle having:
    a cavity defining an interior wall between a top receptacle portion and a bottom receptacle portion;
    a fastener element disposed in the cavity;
    receptacle contacts positioned along the interior wall of the cavity and coupled to conducting elements of the track segment; and
  a joiner component including:
    a top joiner portion;
    a bottom joiner portion opposite the top joiner portion;
    a lateral wall disposed between the top joiner portion and the bottom joiner portion;
    a protruding portion configured to fit within the cavity of the receptacle;
    joiner contacts positioned along a portion of the lateral wall associated with the protruding portion, the joiner contacts are configured to exert an outward lateral force to releasably engage with the receptacle contacts; and
    a complimentary fastener associated with the protruding portion, the complimentary fastener is configured to releasably engage with the fastener element of the receptacle.

2. The low-profile track system of claim 1, wherein the complimentary fastener is configured to releasably engage with the fastener element by exerting a force in a direction orthogonal to the outward lateral force exerted by the joiner contacts.

3. The low-profile track system of claim 1, wherein the joiner component includes a first end portion, a second end portion, and conductive elements;
  wherein the protruding portion is associated with the first end portion;
  wherein the joiner contacts include a first set of joiner contacts associated with the first end portion and a second set of joiner contacts associated with the second end portion; and
  wherein the conductive elements are configured to electrically couple the first set of joiner contacts and the second set of joiner contacts.

4. The low-profile track system of claim 1, wherein the track segment is a first track segment and wherein the joiner component is configured to releasably secure and electrically couple the first track segment to a second track segment.

5. The low-profile track system of claim 4, wherein the joiner component is configured align the first track segment and the second track segment in least one of a flush orientation or a substantially non-coplanar orientation.

6. The low-profile track system of claim 1, wherein the receptacle and the joiner component define respective top planar surfaces, and wherein the joiner component is configured to releasably couple to the receptacle and align the respective top planar surfaces in at least one of a flush orientation or a parallel orientation.

7. The low-profile track system of claim 1, wherein the joiner component includes a first end portion, a second end portion, and conductive elements;
  wherein the protruding portion is associated with the first end portion;
  wherein the second end portion is configured to receive a power feed line; and
  wherein the conductive elements are configured to electrically couple the power feed line to the joiner contacts.

8. A joiner device for a low-profile electrical track system, comprising:
  a top joiner portion;
  a bottom joiner portion opposite the top joiner portion;
  a lateral wall disposed between the top joiner portion and the bottom joiner portion;
  a protruding portion configured to fit within a cavity of a receptacle associated with an end of a track segment;
  joiner contacts positioned along a portion of the lateral wall associated with the protruding portion, the joiner contacts are configured to exert an outward lateral force to releasably engage with receptacle contacts disposed in the cavity of the receptacle; and
  a complimentary fastener associated with the protruding portion, the complimentary fastener is configured to releasably engage with a fastener element disposed in the cavity of the receptacle.

9. The joiner device of claim 8, the complimentary fastener is configured to releasably engage with the fastener element by exerting a force in a direction orthogonal to the outward lateral force.

10. The joiner device of claim 8, further comprising a first end portion, a second end portion, and conductive elements;
  wherein the protruding portion is associated with the first end portion;
  wherein the joiner contacts include a first set of joiner contacts associated with the first end portion and a second set of joiner contacts associated with the second end portion; and
  wherein the conductive elements are configured to electrically couple the first set of joiner contacts and the second set of joiner contacts.

11. The joiner device of claim 8, wherein the track segment is a first track segment and wherein the joiner device is configured to releasably secure and electrically couple the first track segment to a second track segment.

12. The joiner device of claim 11, wherein the joiner device is configured to align the first track segment and the second track segment in at least one of a parallel orientation, a flush orientation, a non-coplanar orientation, or a non-parallel orientation.

13. The joiner device of claim 8, wherein the receptacle and the joiner device define respective top planar surfaces, and wherein the joiner device is configured to releasably couple to the receptacle and align the respective top planar surfaces in at least one of a coplanar orientation or a parallel orientation.

14. The joiner device of claim 13, further comprising a cover, wherein the cover defines the top planar surface of the joiner device.

15. The joiner device of claim 8, further comprising a junction box coupled to the bottom joiner portion.

16. The joiner device of claim 8, further comprising a first end portion, a second end portion, and conductive elements;

wherein the protruding portion is associated with the first end portion;

wherein the second end portion is configured to receive a power feed line; and wherein the conductive elements are configured to electrically couple the power feed line to the joiner contacts.

17. A method, comprising:

providing a joiner body for a joiner device, the joiner body having a top joiner portion, a bottom joiner portion opposite the top joiner portion, a lateral wall between the top joiner portion and the bottom joiner portion, and a protruding portion configured to fit within a cavity of a receptacle associated with an end of a track segment;

providing joiner contacts;

positioning the joiner contacts along a portion of the lateral wall associated with the protruding portion;

biasing the joiner contacts to exert an outward lateral force to releasably engage with receptacle contacts of the receptacle; and associating a complimentary fastener with the protruding portion, the complimentary fastener is configured to releasably engage with a fastener element disposed in the cavity of the receptacle.

18. The method of claim 17, wherein the joiner body includes a first end portion associated with the protruding portion and a second end portion;

wherein providing the joiner contacts further comprises providing a first set of joiner contacts and a second set of joiner contacts;

wherein positioning the joiner contacts further comprises positioning the first set of joiner contacts along the first end portion and positioning the second set of joiner contacts along the second end portion; and wherein the method further comprises providing conductive elements to electrically couple the first set of joiner contacts and the second set of joiner contacts.

19. The method of claim 17, further comprising:

providing a cover for the joiner body, wherein the cover and the receptacle define respective top planar surfaces;

configuring the protruding portion of the joiner body to fit within the cavity of the receptacle to align the respective top planar surfaces in at least one of a coplanar orientation or a parallel orientation.

20. The method of claim 18, wherein the track segment is a first track segment, wherein the joiner body includes a first end portion associated with the protruding portion, a second end portion, the method further comprising:

configuring the second end portion to receive a power feed line;

providing conductive elements to electrically couple the power feed line to the joiner contacts positioned along the portion of the lateral wall associated with the protruding portion.

* * * * *